S. W. SHOREY,

Assignor, by mesne assignments, to WILCOX & GIBBS SEWING MACHINE COMPANY and NATIONAL SEWING MACHINE COMPANY, Limited.

CUTTING AND TRIMMING ATTACHMENT FOR SEWING MACHINES.

No. 10,067. Reissued Mar. 28, 1882.

Witnesses:
D. S. Williams
Harry Drury

Inventor:
Samuel W. Shorey
by his attorneys:
Howson and Sons

THE NORRIS PETERS CO., PHOTO-LITHO., WASHINGTON, D. C.

UNITED STATES PATENT OFFICE.

SAMUEL W. SHOREY, OF BOSTON, MASSACHUSETTS, ASSIGNOR, BY MESNE ASSIGNMENTS, TO WILLCOX & GIBBS SEWING MACHINE COMPANY, OF NEW YORK, N. Y., AND NATIONAL SEWING MACHINE COMPANY, (LIMITED,) OF PHILADELPHIA, PENNSYLVANIA.

CUTTING AND TRIMMING ATTACHMENT FOR SEWING-MACHINES.

SPECIFICATION forming part of Reissued Letters Patent No. 10,067, dated March 28, 1882.

Original No. 148,765, dated March 17, 1874. Application for reissue filed February 8, 1882.

*To all whom it may concern:*

Be it known that I, SAMUEL W. SHOREY, a citizen of the United States, and a resident of Boston, Massachusetts, have invented a certain Improvement in Cutting and Trimming Attachments for Sewing-Machines, of which the following is a specification.

Cutting or trimming attachments have been applied to some extent to sewing-machines for the purpose of cutting off the edge of the work on a line equidistant from the seam, such attachments being particularly useful in machine-stitching leather. For such attachments a vertically-reciprocating cutter has sometimes been used, sometimes a rotary disk-cutter at the end of a horizontal shaft turning in stationary bearings, and sometimes a rotary disk-cutter having intermittent vertical movements, the cutter moving up just before the cloth is fed and remaining up during the feed, it having been found that the cutter was a hinderance to the feed, and not so effective in its cutting operation, if in contact with the work during the feed.

My invention has reference to the employment of a rotary cutter at the end of a horizontal shaft, and to such an arrangement of the mechanism as shall throw the cutting-edge out of action during feeding of the work. I journal my cutter-shaft in stationary bearings, (or bearings that are stationary while the machine is operating,) and I form the cutter with intermittent cutting-edges at one or more breaks in the circular periphery, and I so arrange the parts and so time them in their respective movements that when the feed-bar moves laterally to feed the work a break of the cutter-wheel shall be in juxtaposition to but not in contact with the work, so that there shall be no obstacle to the feed and no drag of the work against the rim of the cutter, the cutting or trimming being effected between the feed movements of the feed bar, or while the work is stationary.

My invention consists primarily in combining with the stitch-forming mechanism a rotary cutter having the cutting part or parts of its periphery eccentric to its axis of rotation.

The drawings represent a machine embodying my invention.

Figure 2:
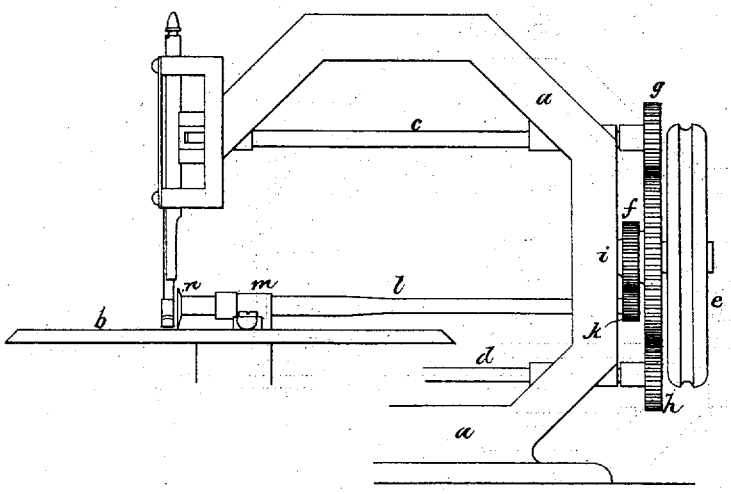
Figure 1:
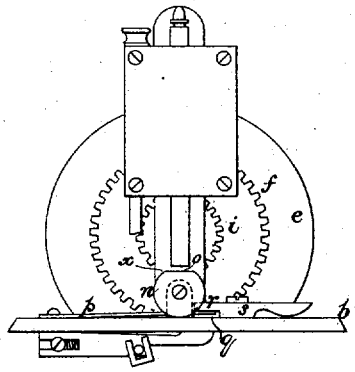
Figure 4:
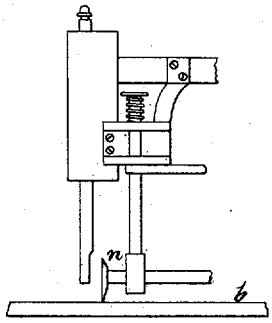
Figure 3:
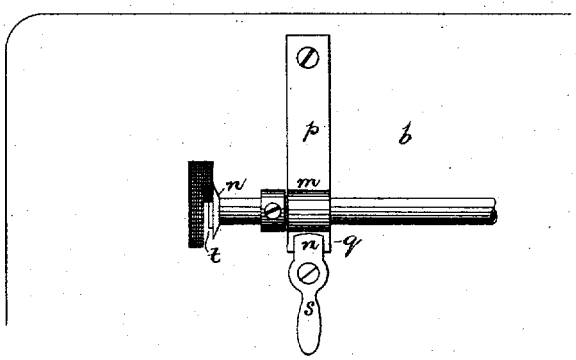

Figure 1 shows the machine in front view. Fig. 2 is a side elevation of it. Fig. 3 is a plan of the work-supporting plate and feed-bar, and of the cutter and adjacent parts. Fig. 4 shows a modification in the arrangement of the cutter-shaft bearing.

*a* denotes the frame of the machine; *b*, the work-plate. Above the plate are the needle, needle-bar, and presser-foot, and beneath the plate the looper and feed-bar, all of these parts, which constitute the stitch-forming mechanism, being operated in the ordinary manner, a horizontal shaft, *c*, above the table and a horizontal shaft, *d*, below the table effecting the respective and relative movements of the needle and the looper and feed-bar, these two shafts being actuated from a driving-wheel, *e*, having a gear, *f*, meshing into pinions *g h* on the shafts *c d*. The wheel *e* has another gear, *i*, meshing into a pinion, *k*, on a shaft, *l*, and this shaft *l* is the cutter-shaft, journaled at its rear end in the frame *a* and passing over the table or work-plate *b* in a bearing, *m*, on top of which the front part of the shaft is journaled. At the extreme front end of the shaft *l* is the rotary cutter *n*, shown as having a circular periphery extending almost around it, but broken at one part, as seen at *o*. The better to show the break, the cutter is represented in Fig. 1 as in that position in which said break is uppermost. The circular part of the cutter runs in a groove in the bed *b*, but the part *o* (as the wheel brings such part undermost, or into a position the reverse of that shown in Fig. 1) is above the plane of the table and of the top of the work. The parts are so timed in their respective movements that the feed-bar moves to feed the work while the part *o* of the wheel is next above the work, the feed being completed and the work stationary by the time the edge *x*, Fig. 1, of the part *o* of the cutter (by which edge *x* the cutting of the work is effected) comes in contact with the work. As the cutter continues to rotate, the cutting-edge *x* of the part *o* thereof passes through the newly-fed portion of the work, and thus the trimming or cutting of the latter is effected without hinderance to the feed.

The part *o* may be simply eccentric to the peripheral circular edge of the cutter; but it is preferably made straight, and the wheel may be made with several cutting-edges at intermittent breaks of the circular periphery, the cutter being of such diameter and its shaft so geared as to bring one of the breaks into position next above the work whenever the latter is being fed.

The bearing for the front end of the shaft I form upon or apply to one end of a strong spring, *p*, the stress of which tends to raise the bearing, and from the bearing I extend a tongue, *q*, over which an inclined lip, *r*, on a button or lever, *s*, slides to bring down the bearing against the stress of the spring and hold the cutter-shaft in position for the cutter to act. When the lever-lip is thrown away from the tongue the spring throws up the bearing and shaft and cutter, the cutter being then out of cutting position, so that work may be freely fed under it and without being acted upon by it.

To keep the edge of the cutter in good condition, I set into the part of the work-plate that it enters a soft-metal plate, *t*, in which I make a groove for entrance of the cutting-edge.

Sometimes I prefer to arrange the cutting mechanism so that when thrown out of action the whole work-plate may be left free from the appendages of the cutter to permit the work to be moved over its whole surface, and for this purpose I hang the bearing for the front end of the shaft from the head or part of the frame over the work-plate.

Fig. 4 shows such a modification, in which the bearing is so hung, and is also made to be held up out of cutting action by a spring, and to be held down by a lever or other suitable mechanism.

I claim—

The combination, substantially as herein described, with stitch-forming mechanism, of a rotary cutter having its cutting edge or edges eccentric.

In testimony whereof I have signed my name to this specification in the presence of two subscribing witnesses.

SAMUEL W. SHOREY.

Witnesses:

G. W. GREGORY,

I. B. CHASE.